(12) United States Patent
Kudo et al.

(10) Patent No.: US 11,111,589 B2
(45) Date of Patent: Sep. 7, 2021

(54) ELECTROLYTIC CELL AND ELECTROLYTIC DEVICE FOR CARBON DIOXIDE

(71) Applicant: KABUSHIKI KAISHA TOSHIBA, Minato-ku (JP)

(72) Inventors: Yuki Kudo, Yokohama (JP); Akihiko Ono, Kita (JP); Masakazu Yamagiwa, Yokohama (JP); Ryota Kitagawa, Setagaya (JP); Jun Tamura, Chuo (JP); Yoshitsune Sugano, Kawasaki (JP); Takayuki Tsukagoshi, Kawasaki (JP); Asahi Motoshige, Ota (JP); Satoshi Mikoshiba, Yamato (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 47 days.

(21) Appl. No.: 16/560,380

(22) Filed: Sep. 4, 2019

(65) Prior Publication Data

US 2020/0002829 A1    Jan. 2, 2020

Related U.S. Application Data

(63) Continuation of application No. PCT/JP2018/033310, filed on Sep. 7, 2018.

(30) Foreign Application Priority Data

Mar. 16, 2018 (JP) .............................. JP2018-049895

(51) Int. Cl.
  *C25B 15/08* (2006.01)
  *C25B 9/23* (2021.01)
  (Continued)

(52) U.S. Cl.
  CPC ................ *C25B 15/08* (2013.01); *C25B 1/04* (2013.01); *C25B 3/25* (2021.01); *C25B 3/26* (2021.01); *C25B 9/23* (2021.01); *C25B 9/73* (2021.01)

(58) Field of Classification Search
  None
  See application file for complete search history.

(56) References Cited

U.S. PATENT DOCUMENTS 4,673,473 A * 6/1987 Ang ...................... C25B 11/035
                                                        204/263
7,857,953 B2   12/2010 Yamada et al.
(Continued)

FOREIGN PATENT DOCUMENTS

CA     2 950 294 A1   12/2015
EP     3 149 228 A1    4/2017
(Continued)

OTHER PUBLICATIONS

Delacourt, Charles, "Electrochemical reduction of carbon dioxide and water to syngas (CO + H2) at room temperature", Environmental Energy Technologies Division at Lawrence Berkeley National Laboratory, 2007, pp. 1-171 (Year: 2007).*

(Continued)

*Primary Examiner* — Harry D Wilkins, III
(74) *Attorney, Agent, or Firm* — Oblon, McClelland, Maier & Neustadt, L.L.P.

(57) ABSTRACT

An electrolytic cell for carbon dioxide of an embodiment includes: an anode part including an anode to oxidize water or a hydroxide ion and thus produce oxygen and an anode solution flow path to supply an anode solution to the anode; a cathode part including a cathode to reduce carbon dioxide and thus produce a carbon compound, a cathode solution flow path to supply a cathode solution to the cathode, a gas flow path to supply the carbon dioxide to the cathode, and (Continued)

a hydrophobic porous body disposed between the cathode and the gas flow path; and a separator to separate the anode part and the cathode part from each other.

20 Claims, 8 Drawing Sheets

(51) Int. Cl.
*C25B 3/26* (2021.01)
*C25B 1/04* (2021.01)
*C25B 3/25* (2021.01)
*C25B 9/73* (2021.01)

(56) References Cited

U.S. PATENT DOCUMENTS

| | | | |
|---|---|---|---|
| 9,157,158 B2 | 10/2015 | Deguchi et al. | |
| 2003/0230495 A1* | 12/2003 | Anderson | C25B 1/12 |
| | | | 205/743 |
| 2013/0186771 A1 | 7/2013 | Zhai et al. | |
| 2014/0131217 A1* | 5/2014 | Buschmann | C01B 15/00 |
| | | | 205/440 |
| 2014/0326603 A1* | 11/2014 | Kamai | C01B 32/50 |
| | | | 204/518 |
| 2017/0037522 A1* | 2/2017 | Kaczur | C25B 1/04 |
| 2017/0268118 A1 | 9/2017 | Ono et al. | |
| 2017/0321334 A1* | 11/2017 | Kuhl | C25B 9/10 |
| 2018/0216243 A1 | 8/2018 | Kudo et al. | |

FOREIGN PATENT DOCUMENTS

| | | | | |
|---|---|---|---|---|
| JP | 2007-119881 A | 5/2007 | | |
| JP | 2012-112001 A | 6/2012 | | |
| JP | WO 2012/118065 A1 | 9/2012 | | |
| JP | 2013-544957 A | 12/2013 | | |
| JP | 2014-167146 A | 9/2014 | | |
| JP | 2014-210982 A | 11/2014 | | |
| JP | 2017-521555 A | 8/2017 | | |
| JP | 2017-172037 A | 9/2017 | | |
| JP | 2018-123390 A | 8/2018 | | |
| KR | 101764797 B1 * | 8/2017 | ............... | C25B 3/04 |
| WO | WO 2016/083193 A1 | 6/2016 | | |

OTHER PUBLICATIONS

Park et al, Effect of PTFE Content in Microporous Layer on Water Management, ECS Transactions, vol. 11, No. 1, Oct. 2007, pp. 623-628 (Year: 2007).*

Weber et al, Effects of Microporous Layers in Polymer Electrolyte Fuel Cells, Journal of the Electrochemical Society, vol. 152, No. 4, Mar. 2005, pp. A677-A688 (Year: 2005).*

International Search Report dated Nov. 6, 2018 in PCT/JP2018/033310 filed Sep. 7, 2018 (with English Translation of Categories of Cited Documents).

Written Opinion dated Nov. 6, 2018 in PCT/JP2018/033310 filed Sep. 7, 2018.

Zengcai Liu et al., "Electrochemical generation of syngas from water and carbon dioxide at industrially important rates," Journal of $CO_2$ Utilization, 15, (2016), 7 pages.

Sichao Ma et al., "Efficient Electrochemical Flow System with Improved Anode for the Conversion of $CO_2$ to CO," Journal of the Electrochemical Society, 161(10) F1124-F1131 (2014).

* cited by examiner

ELECTROLYTIC CELL AND ELECTROLYTIC DEVICE FOR CARBON DIOXIDE

CROSS-REFERENCE TO RELATED APPLICATION

This application is a continuation of prior International Application No. PCT/JP2018/033310, filed on Sep. 7, 2018 which is based upon and claims the benefit of priority from Japanese Patent Application No. 2018-049895, filed on Mar. 16, 2018; the entire contents of all of which are incorporated herein by reference.

FIELD

Embodiments described herein relate to an electrolytic cell and an electrolytic device for carbon dioxide.

BACKGROUND

In recent years, there has been a concern about the depletion of fossil fuel such as petroleum and coal, and expectations are increasing for sustainable renewable energy. Examples of the renewable energy include those by a solar battery and wind power generation. The amount of power generated by these depends on weather and nature conditions, and thus they have a problem of difficulty in stably supplying the power. In light of this, it has been attempted to store, in a storage battery, the power generated from the renewable energy, so as to stabilize the power supply. However, when the electric power is stored, there are problems that a cost is required for the storage battery and a loss occurs at a time of storage.

What is gaining attention under such circumstances is a technique which, by using power generated from renewable energy, electrolyzes water to produce hydrogen ($H_2$) from the water, or electrochemically reduces carbon dioxide ($CO_2$) to convert it into a chemical substance (chemical energy) such as a carbon compound such as carbon monoxide (CO), formic acid (HCOOH), methanol ($CH_3OH$), methane ($CH_4$), acetic acid ($CH_3COOH$), ethanol ($C_2H_5OH$), ethane ($C_2H_6$), or ethylene ($C_2H_4$). Storing these chemical substances in a cylinder or a tank has advantages of being lower in energy storage cost and smaller in storage loss than storing the power (electric energy) in the storage battery.

Regarding an electrolytic cell for carbon dioxide, studies have been conducted on a structure including a cathode which is in contact with a cathode solution and a $CO_2$ gas, an anode which is in contact with an anode solution, and a separator which separates the cathode and the anode from each other. The cathode has, for example, a catalyst layer and a gas diffusion layer, with the catalyst layer in contact with the cathode solution and the gas diffusion layer in contact with the $CO_2$ gas. A solution flow path for supplying the cathode solution is disposed, for example, between the separator and the cathode. A gas flow path for supplying the $CO_2$ gas is disposed along a surface of the cathode opposite its surface in contact with the solution flow path. Imparting appropriate hydrophobicity to the gas diffusion layer of such a cathode achieves a good supply balance of the liquid (cathode solution) and the gas ($CO_2$ gas) near a catalyst. As the gas diffusion layer, a material having electrical conductivity is used to allow the passage of a current to the cathode, and for example, carbon paper is used. The carbon paper used as the gas diffusion layer is impregnated with a hydrophobic resin such as, for example, a fluororesin in an amount of about 5 to 10% so that its gas diffusion efficiency based on the appropriate hydrophobicity increases while its electrical conductivity is maintained.

When a constant current is passed across the cathode and the anode to cause the reaction that produces CO from $CO_2$, using an electrolytic device including such an electrolytic cell, a problem may occur that the cathode solution permeates the $CO_2$ gas flow path side due to, for example, nonuniform hydrophobicity in the gas diffusion layer of the cathode. The mixture of the cathode solution into the $CO_2$ gas flow path causes a pressure increase in the gas flow path to break the gas-liquid supply balance near the catalyst, which may lead to a fluctuation in cell voltage. Further, an electrolyte in the cathode solution precipitates in the $CO_2$ gas flow path, which may clog the gas flow path.

DETAILED DESCRIPTION

An electrolytic cell for carbon dioxide of an embodiment includes: an anode part including an anode to oxidize water or a hydroxide ion and thus produce oxygen and an anode solution flow path to supply an anode solution to the anode; a cathode part including a cathode to reduce carbon dioxide and thus produce a carbon compound, a cathode solution flow path to supply a cathode solution to the cathode, a gas flow path to supply the carbon dioxide to the cathode, and a hydrophobic porous body disposed between the cathode and the gas flow path; and a separator to separate the anode part and the cathode part from each other.

An electrolytic cell and an electrolytic device for carbon dioxide of embodiments will be hereinafter described with reference to the drawings. In the embodiments, substantially the same components are denoted by the same reference signs, and a description thereof may be partly omitted. The drawings are schematic, and a relation between thickness and planar dimension, a thickness ratio among parts, and so on may be different from actual ones.

First Embodiment

Figure 1:
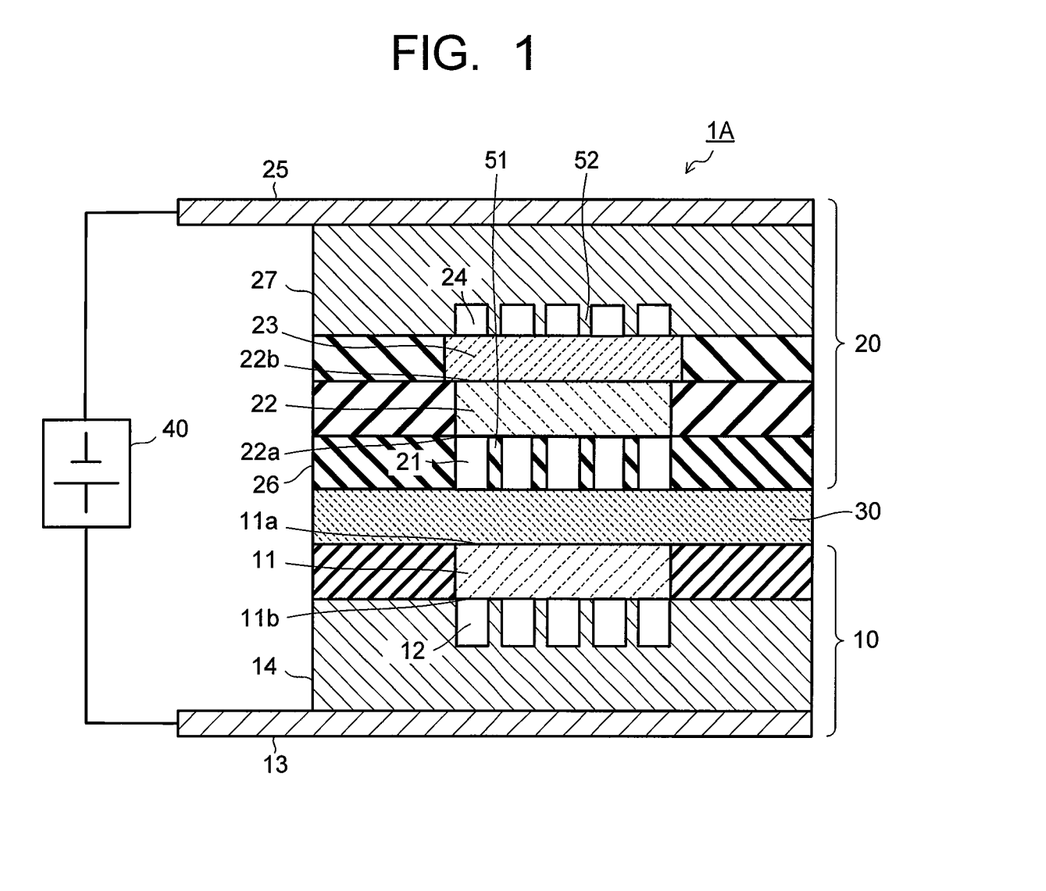
FIG. 1 is a sectional view illustrating an electrolytic cell of a first embodiment.

FIG. 1 is a sectional view illustrating the structure of an electrolytic cell for carbon dioxide according to a first embodiment. The electrolytic cell 1 (1A) for carbon dioxide illustrated in FIG. 1 includes an anode part 10, a cathode part 20, and a separator 30. The anode part 10 includes an anode 11, an anode solution flow path 12, and an anode current collector plate 13. The cathode part 20 includes a cathode solution flow path 21, a cathode 22, a hydrophobic porous body 23, a $CO_2$ gas flow path 24, and a cathode current collector plate 25. The separator 30 is disposed so as to separate the anode part 10 and the cathode part 20 from each other. The electrolytic cell 1A is sandwiched by a not-illustrated pair of support plates and is further fastened with bolts or the like. In FIG. 1, reference sign 40 denotes a power source which passes a current to the anode 11 and the cathode 22. The electrolytic cell 1A and the power source 40 constitute an electrolytic device for carbon dioxide of the embodiment. The power source 40 is not limited to an ordinary commercial power source, battery, or the like, and may be one that supplies power generated from renewable energy by a solar battery and wind power generation.

The anode 11 is an electrode (oxidation electrode) which causes an oxidation reaction of water ($H_2O$) present in an anode solution to produce oxygen ($O_2$) and hydrogen ions ($H^+$), or causes an oxidation reaction of hydroxide ions ($OH^-$) produced in the cathode part 20 to produce oxygen ($O_2$) and water ($H_2O$). The anode 11 has a first surface 11a in contact with the separator 30 and a second surface 11b facing the anode solution flow path 12. The first surface 11a of the anode 11 is in close contact with the separator 30. The anode solution flow path 12 supplies the anode solution to the anode 11 and is constituted by pits (grooves/depressions) provided in a first flow path plate 14. A solution inlet port and a solution outlet port, which are not illustrated, connect with the first flow path plate 14, and the anode solution is introduced and discharged by a not-illustrated pump through these solution inlet port and solution outlet port. The anode solution flows in the anode solution flow path 12 to come into contact with the anode 11. The anode current collector plate 13 is in electrical contact with a surface of the first flow path plate 14 constituting the anode solution flow path 12, opposite the anode 11.

The anode 11 is preferably formed mainly of a catalyst material (anode catalyst material) that is capable of producing oxygen and hydrogen ions by oxidizing water ($H_2O$) or of producing water and oxygen by oxidizing hydroxide ions ($OH^-$) and that is capable of decreasing overvoltages of such reactions. Examples of such a catalyst material include metals such as platinum (Pt), palladium (Pd), and nickel (Ni), alloys and intermetallic compounds containing any of these metals, binary metal oxides such as manganese oxide (Mn—O), iridium oxide (Ir—O), nickel oxide (Ni—O), cobalt oxide (Co—O), iron oxide (Fe—O), tin oxide (Sn—O), indium oxide (In—O), ruthenium oxide (Ru—O), lithium oxide (Li—O), and lanthanum oxide (La—O), ternary metal oxides such as Ni—Co—O, Ni—Fe—O, La—Co—O, Ni—La—O, and Sr—Fe—O, quaternary metal oxides such as Pb—Ru—Ir—O and La—Sr—Co—O, and metal complexes such as a Ru complex and a Fe complex.

The anode 11 includes a base material having a structure allowing the anode solution and ions to move between the separator 30 and the anode solution flow path 12, for example, having a porous structure such as a mesh material, a punched material, a porous body, or a metal fiber sintered compact. The base material may be formed of a metal material of a metal such as titanium (Ti), nickel (Ni), or iron (Fe) or an alloy (for example, SUS) containing at least one of these metals, may be formed of a carbon material, or may be formed of the aforesaid anode catalyst material. Where the oxide is used as the anode catalyst material, it is preferable to form a catalyst layer by sticking or stacking the anode catalyst material on a surface of the base material formed of the aforesaid metal material or carbon material. The anode catalyst material preferably has nanoparticles, a nanostructure, a nanowire, or the like in order to promote the oxidation reaction. The nanostructure is a structure in which nanoscale irregularities are formed on a surface of the catalyst material.

The cathode 22 is an electrode (reduction electrode) which causes a reduction reaction of carbon dioxide ($CO_2$) and a reduction reaction of a carbon compound produced by the carbon dioxide reduction reaction to produce a carbon compound such as carbon monoxide (CO), methane ($CH_4$), ethane ($C_2H_6$), ethylene ($C_2H_4$), methanol ($CH_3OH$), ethanol ($C_2H_5OH$), or ethylene glycol ($C_2H_6O_2$). The cathode 22 has a first surface 22a facing the cathode solution flow path 21 and a second surface 22b in contact with the hydrophobic porous body 23. The cathode solution flow path 21 is disposed between the cathode 22 and the separator 30 so that a cathode solution comes into contact with the cathode 22 and the separator 30. The $CO_2$ gas flow path 24 faces a surface of the hydrophobic porous body 23 opposite its surface in contact with the cathode 22 so that a $CO_2$ gas comes into contact with the cathode 22 through the hydrophobic porous body 23.

The cathode solution flow path 21 is constituted by openings provided in a second flow path plate 26. A solution inlet port and a solution outlet port, which are not illustrated, connect with the second flow path plate 26, and the cathode solution is introduced and discharged by a not-illustrated pump through these solution inlet port and solution outlet port. The cathode solution flows in the cathode solution flow path 21 to come into contact with the cathode 22 and the separator 30. As illustrated in FIG. 1, a plurality of lands (projections) 51 may be provided in the cathode solution flow path 21 to adjust the length, a route, and so on of the cathode solution flow path 21. In this case, it is preferable to alternately provide the plurality of lands 51 so that the cathode solution flow path 21 meanders. Alternatively, the lands (projections) 51 may be provided near the center of the cathode solution flow path 21 for the purpose of mechanical support and electrical conduction. In this case, the lands 51 are preferably held in the second flow path plate 26 by bridge portions (not illustrated) thinner than the lands 51 so as not to prevent the flow of the cathode solution in the cathode solution flow path 21.

The $CO_2$ gas flow path 24 is constituted by pits (grooves/depressions) provided in a third flow path plate 27. A gas inlet port and a gas outlet port, which are not illustrated, connect with the third flow path plate 27, and a gas containing $CO_2$ (sometimes simply called $CO_2$ gas) is introduced and discharged through these gas inlet port and gas outlet port by a not-illustrated flow rate controller. The gas containing $CO_2$ flows in the $CO_2$ gas flow path 24 to come into contact with the cathode 22 through the hydrophobic porous body 23. The cathode current collector plate 25 is in electrical contact with a surface of the third flow path plate 27 opposite the cathode 22. In the $CO_2$ gas flow path 24, lands (projections) 52 may be provided as illustrated in FIG. 1 to adjust the length, a route, and so on of the $CO_2$ gas flow path 24. In this case, the lands 52 may be disposed such that their longitudinal direction is perpendicular or parallel to the longitudinal direction of the lands 51 in the cathode solution flow path 21. To reduce cell resistance, the smaller the number of the lands 52 in the $CO_2$ gas flow path 24, the more preferable.

Figure 2:
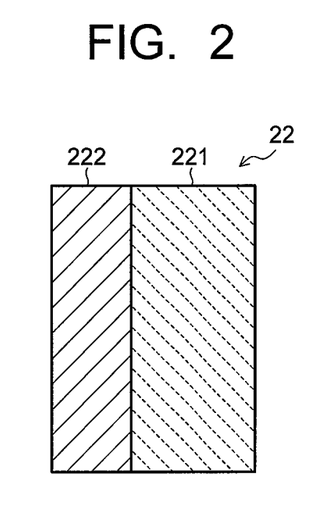
FIG. 2 is a view illustrating an example of a cathode in the electrolytic cell of the embodiment.
Figure 3:
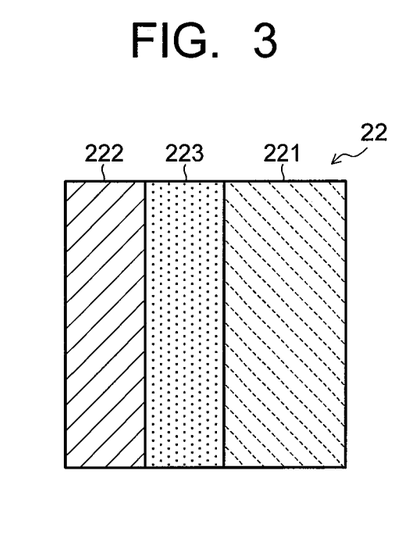
FIG. 3 is a view illustrating another example of the cathode in the electrolytic cell of the embodiment.
Figure 4:
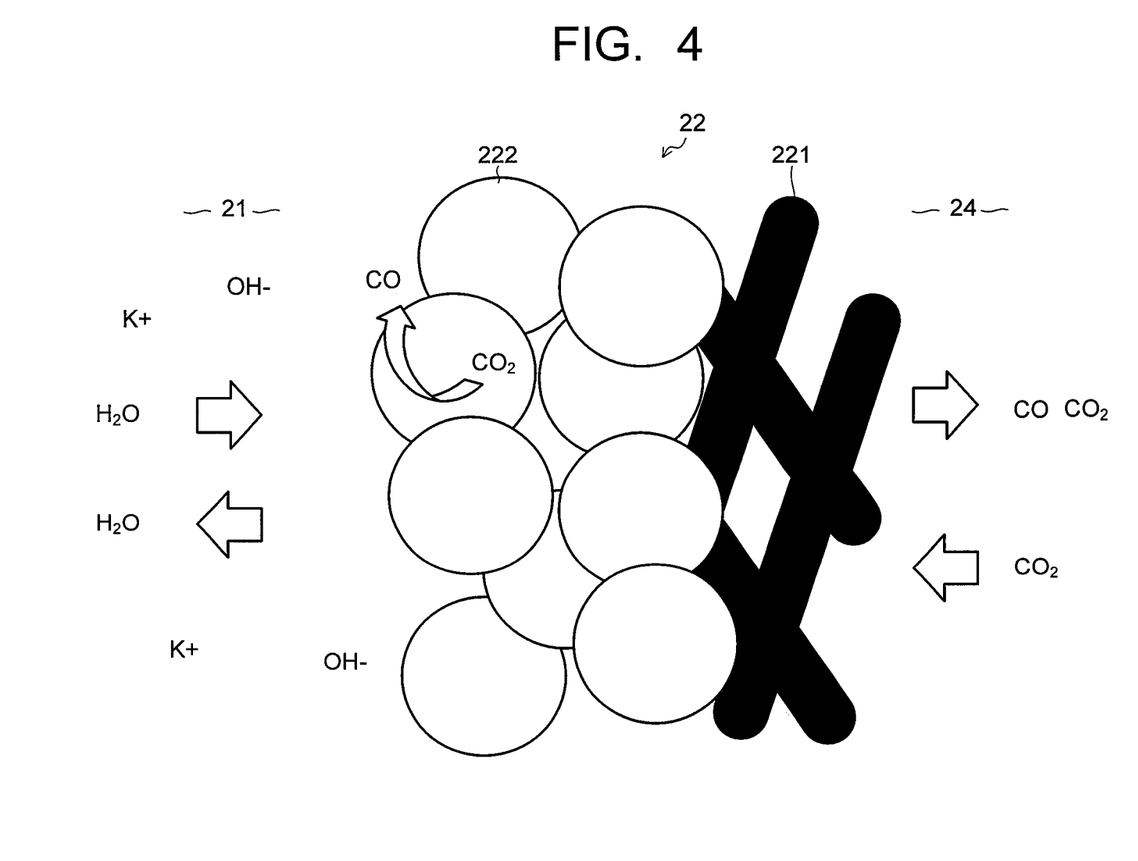
FIG. 4 is a view illustrating a reaction in the cathode in the electrolytic cell of the embodiment.

As illustrated in FIG. 2, the cathode 22 has a gas diffusion layer 221 and a cathode catalyst layer 222 provided thereon. As illustrated in FIG. 3, between the gas diffusion layer 221 and the cathode catalyst layer 222, a porous layer 223 denser than the gas diffusion layer 221 may be disposed. As illustrated in FIG. 4, the gas diffusion layer 221 is disposed on the $CO_2$ gas flow path 24 side, and the cathode catalyst layer 222 is disposed on the cathode solution flow path 21 side. Incidentally, the hydrophobic porous body 23, though not illustrated in FIG. 4, is disposed between the gas diffusion layer 221 and the $CO_2$ gas flow path 24. The cathode catalyst layer 222 preferably has catalyst nanoparticles or a catalyst nanostructure.

The gas diffusion layer 221 is formed of a material having electrical conductivity, for example, carbon paper, carbon cloth, or the like so as to pass a current from the cathode current collector plate 25 to the cathode 22. Further, in order to keep the supply balance of the cathode solution and the $CO_2$ gas near a catalyst of the cathode catalyst layer 222, treatment for imparting appropriate hydrophobicity is preferably applied to the carbon paper, the carbon cloth, or the like which is the gas diffusion layer 221. Hydrophobicity is a property of low affinity with water. Examples of a material exhibiting hydrophobicity include fluororesins such as polytetrafluoroethylene (PTFE), polychlorotrifluoroethylene, polyvinylidene fluoride, polyvinyl fluoride, and a perfluoroalkoxy fluororesin. The carbon paper, the carbon cloth, or the like containing such a fluororesin makes it possible for the gas diffusion layer 221 to have the appropriate hydrophobicity while maintaining the conductivity. The porous layer 223 is preferably formed of a porous body smaller in pore size than the carbon paper or the carbon cloth.

As described above, the gas diffusion layer 221 preferably has a composite in which the conductive porous body such as the carbon paper or the carbon cloth is appropriately impregnated with the material exhibiting hydrophobicity (hydrophobic resin or the like) such as the fluororesin. The content of the fluororesin in the gas diffusion layer 221 is preferably within a range of 5 to 10 mass %. The content (mass %) of the fluororesin mentioned here is a mass ratio of the fluororesin to the total amount of the gas diffusion layer 221. If the content of the fluororesin in the gas diffusion layer 221 is over 10 mass %, the cathode solution does not sufficiently permeate the gas diffusion layer 221, which may lead to low efficiency of the contact between the cathode solution and the $CO_2$ gas. If the content of the fluororesin in the gas diffusion layer 221 is less than 5 mass %, the cathode solution may excessively permeate the gas diffusion layer 221. In either case, the supply balance of the cathode solution and the $CO_2$ gas near the catalyst is likely to worsen, and it is not possible to sufficiently increase the reactivity of the cathode solution and the $CO_2$ gas.

As illustrated in the schematic view in FIG. 4, in the cathode catalyst layer 222, the cathode solution and ions are supplied and discharged from/to the cathode solution flow path 21, and in the gas diffusion layer 221, the $CO_2$ gas is supplied from and a product of the reduction reaction of the $CO_2$ gas is discharged to the $CO_2$ gas flow path 24 through the hydrophobic porous body 23. Owing to the appropriate hydrophobic treatment applied to the gas diffusion layer 221, mainly the $CO_2$ gas reaches the cathode catalyst layer 222 due to gas diffusion. The reduction reaction of $CO_2$ and the reduction reaction of the carbon compound produced by the $CO_2$ reduction reaction take place mainly near the boundary between the gas diffusion layer 221 and the cathode catalyst layer 222, and a gaseous product is discharged mainly through the $CO_2$ gas flow path 24 and a liquid product is discharged mainly through the cathode solution flow path 21. For the efficient $CO_2$ reduction reaction, the $CO_2$ gas, and the ions and $H_2O$ necessary for the reaction are preferably supplied and discharged to/from the cathode catalyst layer 222 in a well-balanced manner.

The cathode catalyst layer 222 is preferably formed of a catalyst material (cathode catalyst material) that is capable of producing a carbon compound by reducing carbon dioxide, and as required, producing a carbon compound by reducing the carbon compound produced by the carbon dioxide reduction, and is also capable of decreasing overvoltages of such reactions. Examples of such a material include metal materials of metals such as gold (Au), silver (Ag), copper (Cu), platinum (Pt), palladium (Pd), nickel (Ni), cobalt (Co), iron (Fe), manganese (Mn), titanium (Ti), cadmium (Cd), zinc (Zn), indium (In), gallium (Ga), lead (Pb), and tin (Sn), and of alloys and intermetallic compounds including at least one of these metals, carbon materials such as carbon (C), graphene, CNT (carbon nanotube), fullerene, and ketjen black, and metal complexes such as a Ru complex and a Re complex. The cathode catalyst layer 222 may have any of various shapes such as a plate shape, a mesh shape, a wire shape, a granular shape, a porous shape, a thin film shape, and an island shape.

The cathode catalyst material forming the cathode catalyst layer 222 preferably has nanoparticles of the aforesaid metal material, a nanostructure of the metal material, a nanowire of the metal material, or a composite in which the nanoparticles of the aforesaid metal material are carried by the carbon material such as carbon particles, carbon nanotube, or graphene particles. By employing the catalyst nanoparticles, the catalyst nanostructure, the catalyst nanowire, the nano-catalyst carried structure, or the like as the cathode catalyst material, it is possible to increase the reaction efficiency of the reduction reaction of carbon dioxide in the cathode 22.

Figure 5:
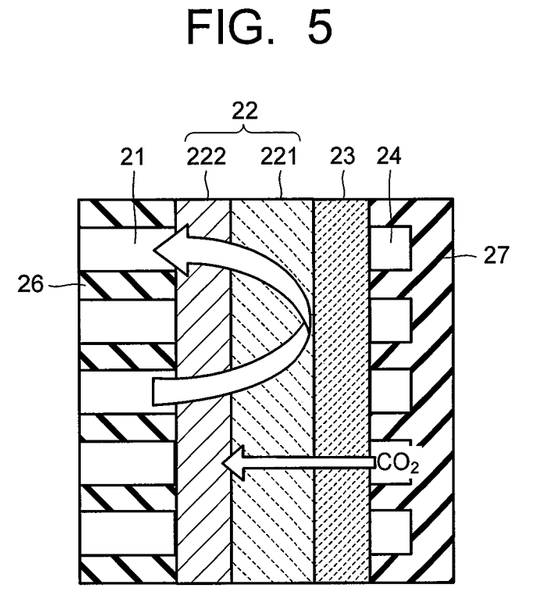
FIG. 5 is a view illustrating a $CO_2$ gas flow path, a hydrophobic porous body, the cathode, and a cathode solution flow path in the electrolytic cell of the first embodiment.

As illustrated in FIG. 1 and FIG. 5, the hydrophobic porous body 23 is disposed between the gas diffusion layer 221 of the cathode 22 and the $CO_2$ gas flow path 24, and has a function of not only allowing the $CO_2$ gas supplied from the $CO_2$ gas flow path 24 to pass toward the gas diffusion layer 221 but also blocking the cathode solution which has permeated the cathode 22 from the cathode solution flow path 21 to prevent the cathode solution from flowing into the $CO_2$ gas flow path 24. The prevention of the cathode solution from flowing into the $CO_2$ gas flow path 24 makes it possible to reduce a pressure increase in the $CO_2$ gas flow path 24. This keeps the supply balance of the cathode solution and the $CO_2$ gas near the catalyst, thereby capable of reducing a cell voltage fluctuation and so on. Further, since the precipitation of an electrolyte present in the cathode solution into the $CO_2$ gas flow path 24 can be prevented, the clogging of the $CO_2$ gas flow path 24 due to the precipitation of the electrolyte is reduced. This enables to enhance the property of the electrolytic cell 1A and its sustainability.

In the electrolytic cell 1A having the structure illustrated in FIG. 1, since the current is passed to the cathode 22 from the cathode current collector plate 25 through the hydrophobic porous body 23, the hydrophobic porous body 23 preferably has appropriate conductivity in addition to the hydrophobicity for blocking the cathode solution. Examples of the hydrophobic porous body 23 having such properties include a composite in which a porous material having conductivity, such as carbon paper or carbon cloth, is sufficiently impregnated with a hydrophobic material within a range not impairing the conductivity. Examples of a material imparting the hydrophobicity to the conductive porous material such as the carbon paper or the carbon cloth include the aforesaid fluororesins such as polytetrafluoroethylene (PTFE), polychlorotrifluoroethylene, polyvinylidene fluoride, polyvinyl fluoride, and a perfluoroalkoxy fluororesin.

Requiring no consideration of the gas-liquid balance near the catalyst unlike the aforesaid gas diffusion layer 221, the hydrophobic porous body 23 is preferably impregnated with the hydrophobic material sufficiently within a range not impairing the conductivity. Specifically, the content of the fluororesin in the hydrophobic porous body 23 is preferably 50 mass % or more. However, too large a content of the fluororesin may impair the conductivity of the hydrophobic porous body 23, and accordingly the content of the fluororesin is preferably 90 mass % or less, and more preferably 70 mass % or less.

Further, the hydrophobic porous body 23 preferably has appropriate pores in order to allow the $CO_2$ gas supplied from the $CO_2$ gas flow path 24 to pass toward the gas diffusion layer 221. The porosity of the hydrophobic porous body 23 is preferably 40% or more, more preferably 60% or more, and still more preferably 80% or more. However, too high a porosity of the hydrophobic porous body 23 may impair the property of blocking the cathode solution, and therefore the porosity is preferably 90% or less. The area of the hydrophobic porous body 23 may be equal to the area of the cathode 22, but in order to increase the property of preventing the permeation of the cathode solution, the area of the hydrophobic porous body 23 is preferably larger than the area of the cathode 22. A ratio (A/B) of the area A of the hydrophobic porous body 23 to the area B of the cathode 22 is preferably 1.2 or more.

The separator 30 is formed of an ion exchange membrane or the like that allows ions to move between the anode 11 and the cathode 22 and also that can separate the anode part 10 and the cathode part 20 from each other. Examples usable as the ion exchange membrane include cation exchange membranes such as Nafion and Flemion and anion exchange membranes such as Neosepta and Selemion. Where an alkaline solution is used as the anode solution or the cathode solution and the movement of hydroxide ions ($OH^-$) is assumed as will be described later, the separator 30 is preferably formed of the anion exchange membrane. However, besides the ion exchange membrane, a glass filter, a porous polymer membrane, a porous insulating material, or the like may be used as the separator 30, provided that the material allows the ions to move between the anode 11 and the cathode 22.

The anode solution and the cathode solution each preferably are a solution containing at least water ($H_2O$). Since carbon dioxide ($CO_2$) is supplied from the $CO_2$ gas flow path 24, the cathode solution may be either a solution containing carbon dioxide ($CO_2$) or a solution not containing carbon dioxide ($CO_2$). The same solution may be used as the anode solution and the cathode solution, or different solutions may be used as these. Examples of the $H_2O$-containing solution used as the anode solution and the cathode solution include an aqueous solution containing an optional electrolyte. Examples of the electrolyte-containing aqueous solution include an aqueous solution containing at least one kind of ions selected from hydroxide ions ($OH^-$), hydrogen ions ($H^+$), potassium ions ($K^+$), sodium ions ($Na^+$), lithium ions ($Li^+$), cesium ions ($Cs^+$), chloride ions ($Cl^-$), bromide ions ($Br^-$), iodide ions ($I^-$), nitrate ions ($NO_3^-$), sulfate ions ($SO_4^{2-}$), phosphate ions ($PO_4^{2-}$), borate ions ($BO_3^{3-}$), and hydrogen carbonate ions ($HCO_3^-$). In order to reduce the electrical resistance of the solution, an alkali solution in which an electrolyte such as potassium hydroxide or sodium hydroxide is dissolved with a high concentration is preferably used as the anode solution and the cathode solution.

As the cathode solution, an ionic liquid that is made from salt of cations such as imidazolium ions or pyridinium ions and anions such as $BF_4^-$ or $PF_6^-$ and is in a liquid state in a wide temperature range may be used, or its aqueous solution may be used. Other examples of the cathode solution include solutions of amines such as ethanolamine, imidazole, and pyridine and their aqueous solutions. The amine may be any of primary amine, secondary amine, and tertiary amine.

As the first flow path plate 14 forming the anode solution flow path 12 and the third flow path plate 27 forming the $CO_2$ gas flow path, a material low in chemical reactivity and high in conductivity is preferably used. Examples of such a material include metal materials such as Ti and SUS, and carbon. As the second flow path plate 26 forming the cathode solution flow path 21, a material low in chemical reactivity and having no conductivity is preferably used. Examples of such a material include insulating resin materials such as an acrylic resin, polyetheretherketone (PEEK), and a fluororesin.

Incidentally, in the first flow path plate 14, the second flow path plate 26, and the third flow path plate 27, the solution or gas inlet ports and outlet ports, screw holes used when a stack of the constituent elements is fastened, and so on are provided, though not illustrated. Further, in front of and behind each of the flow path plates 14, 26, 27, not-illustrated packings are inserted as required.

Next, the operation of an electrolytic device using the electrolytic cell 1A for carbon dioxide of the embodiment will be described. Here, a case where carbon monoxide (CO) is produced as a carbon compound will be mainly described, but the carbon compound as a reduction product of carbon dioxide is not limited to carbon monoxide. The carbon compound may be methane ($CH_4$), ethane ($C_2H_6$), ethylene ($C_2H_4$), methanol ($CH_3OH$), ethanol ($C_2H_5OH$), ethylene glycol ($C_2H_6O_2$), or the like as previously described, and through the further reduction of the carbon monoxide which is the reduction product, the aforesaid organic compound may be produced. Further, a reaction process by the electrolytic cell 1A can be to produce mainly hydrogen ions ($H^+$) or to produce mainly hydroxide ions ($OH^-$), but is not limited to either of these reaction processes.

First, the reaction process of producing mainly hydrogen ions ($H^+$) by oxidizing water ($H_2O$) will be described. When a current is supplied across the anode 11 and the cathode 22 from the power source 40, an oxidation reaction of water ($H_2O$) takes place in the anode 11 in contact with the anode solution. Specifically, as expressed by the following formula (1), through the oxidation of $H_2O$ contained in the anode solution, oxygen ($O_2$) and hydrogen ions ($H^+$) are produced.

$$2H_2O \rightarrow 4H^+ + O_2 + 4e^- \quad (1)$$

$H^+$ produced in the anode 11 moves in the anode solution present in the anode 11, the separator 30, and the cathode solution present in the cathode solution flow path 21 to reach the vicinity of the cathode 22. By electrons ($e^-$) based on the current supplied from the power source 40 to the cathode 22 and $H^+$ which has moved to the vicinity of the cathode 22, the reduction reaction of the carbon dioxide ($CO_2$) is caused. Specifically, as expressed by the following formula (2), through the reduction of $CO_2$ supplied from the $CO_2$ gas flow path 24 to the cathode 22, CO is produced.

$$2CO_2 + 4H^+ + 4e^- \rightarrow 2CO + 2H_2O \quad (2)$$

Next, the reaction process of producing mainly hydroxide ions (OH⁻) through the reduction of carbon dioxide ($CO_2$) will be described. When a current is supplied across the anode 11 and the cathode 22 from the power source 40, near the cathode 22, water ($H_2O$) and carbon dioxide ($CO_2$) are reduced, so that carbon monoxide (CO) and hydroxide ions (OH⁻) are produced as expressed by the following formula (3). The hydroxide ions (OH⁻) diffuse to the vicinity of the anode 11, and as expressed by the following formula (4), the hydroxide ions (OH⁻) are oxidized, so that oxygen ($O_2$) is produced.

$$2CO_2 + 2H_2O + 4e^- \rightarrow 2CO + 4OH^- \quad (3)$$

$$4OH^- \rightarrow 2H_2O + O_2 + 4e^- \quad (4)$$

Both in the reaction process of producing mainly the hydrogen ions (H⁺) and the reaction process of producing mainly the hydroxide ions (OH⁻) described above, oxygen ($O_2$) is produced in the anode 11, and the carbon compound is produced through the reduction of $CO_2$ in the cathode 22.

In a conventional cell structure where the $CO_2$ gas flow path 24 directly faces the cathode 22 (for example, the gas diffusion layer 221), the cathode solution may permeate the $CO_2$ gas flow path 24 to mix into the $CO_2$ gas flow path 24. In the $CO_2$ gas flow path 24, a gas-liquid two-phase flow of the $CO_2$ gas and the cathode solution, if generated, increases the pressure. The pressure increase causes the excessive supply of the $CO_2$ gas to the cathode catalyst layer 222 to break the supply balance of the $CO_2$ gas and the cathode solution near the catalyst, which may lead to a fluctuation in cell output. Further, the electrolyte of the cathode solution mixed into the $CO_2$ gas flow path 24 may precipitate to clog the $CO_2$ gas flow path 24. In contrast, in the electrolytic cell 1A of the embodiment, since the hydrophobic porous body 23 is provided between the cathode 22 (for example, the gas diffusion layer 221) and the $CO_2$ gas flow path 24, the hydrophobic porous body 23 blocks the cathode solution to prevent the cathode solution from mixing into the $CO_2$ gas flow path 24. Therefore, the cell output fluctuation and the clogging of the $CO_2$ gas flow path 24 which are caused by the mixture of the cathode solution into the $CO_2$ gas flow path 24 are inhibited, making it possible to enhance the property of the electrolytic cell 1A and its sustainability.

Second Embodiment

Next, an electrolytic cell for carbon dioxide according to a second embodiment will be described with reference to FIG. 6. The electrolytic cell 1B for carbon dioxide illustrated in FIG. 6 includes an anode part 10, a cathode part 20, and a separator 30 as in the first embodiment. The structures of the anode part 10, the cathode part 20, and the separator 30 are the same as those of the first embodiment. The electrolytic cell 1B is sandwiched by a not-illustrated pair of support plates and is further fastened with bolts or the like as in the first embodiment. In the electrolytic cell 1B illustrated in FIG. 6, a current is supplied to the anode 11 and the cathode 22 from a power source 40 through the anode current collector plate 13 and the cathode current collector plate 25 as in the first embodiment. The electrolytic cell 1B and the power source 40 constitute an electrolytic device for carbon dioxide according to the second embodiment.

Figure 6:
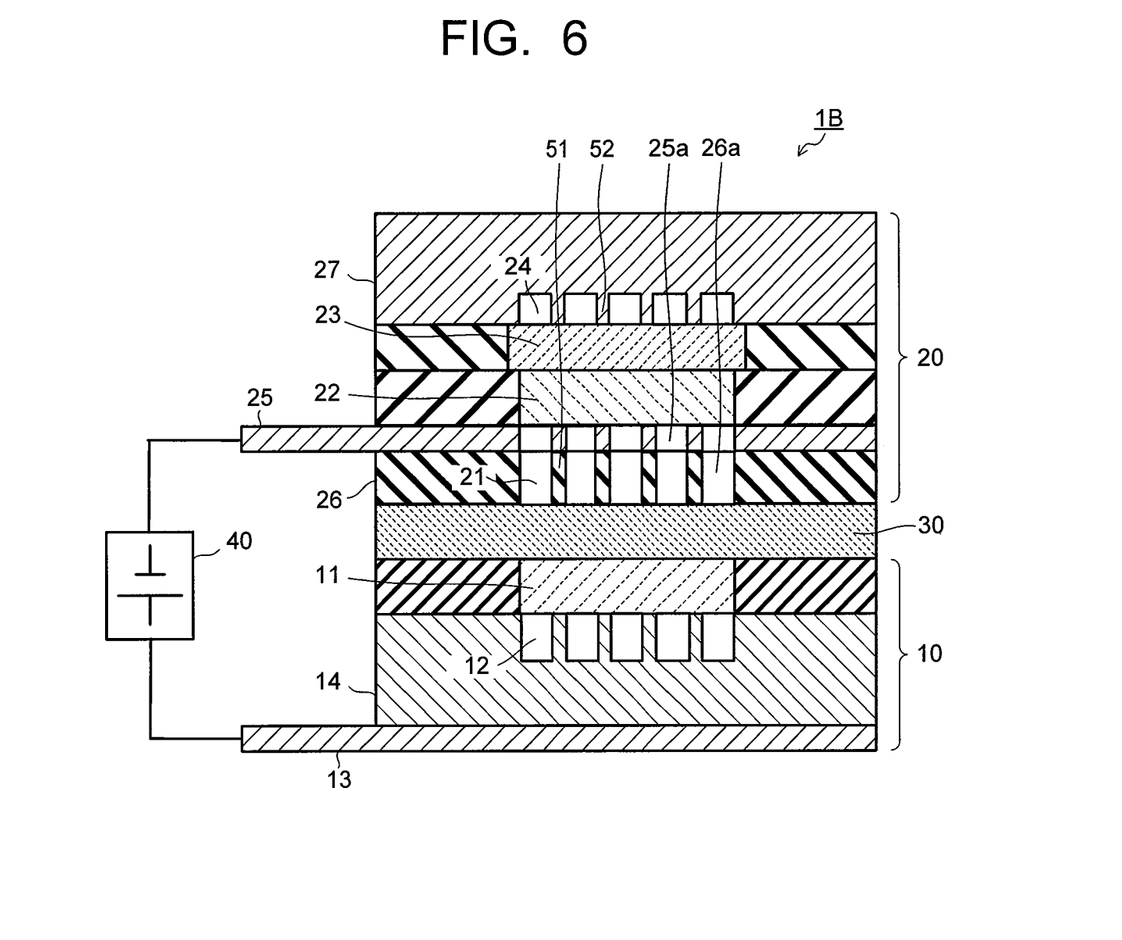
FIG. 6 is a sectional view illustrating an electrolytic cell of a second embodiment.

In the electrolytic cell 1B illustrated in FIG. 6, the cathode current collector plate 25 is disposed between the second flow path plate 26 forming the cathode solution flow path 21 and the cathode 22, which is a different point from the electrolytic cell 1A of the first embodiment. The cathode current collector plate 25 is in contact with the cathode 22 (for example, the cathode catalyst layer 222), so that they are in electrical continuity. In order for the cathode current collector plate 25 disposed between the second flow path plate 26 and the cathode 22 not to prevent the cathode solution flowing in the cathode solution flow path 21 from coming into contact with the cathode 22, openings 25a with an open area ratio of 40% or more are provided in the cathode collector plate 25. The cathode solution flowing in the cathode solution flow path 21 is capable of coming into contact with the cathode 22 through the openings 25a. The openings 25a of the cathode current collector plate 25 are preferably aligned with openings (openings 26a provided in the second flow path plate 26) constituting the cathode solution flow path 21. As the cathode current collector plate 25, a material low in chemical reactivity and high in conductivity is preferably used. Examples of such a material include metal materials such as Ti and SUS, and carbon.

Disposing the cathode current collector plate 25 between the second flow path plate 26 and the cathode 22 enables the use of an insulator as the hydrophobic porous body 23. Here, the hydrophobic porous body 23 preferably has a large content of the fluororesin in order to have an enhanced hydrophobic function. However, as the content of the fluororesin increases, electrical conductivity is degraded. In the electrolytic cell 1A of the first embodiment, the degradation in the electrical conductivity of the hydrophobic porous body 23 increases an IR loss due to the resistance of the hydrophobic porous body 23, which may lower $CO_2$ reduction efficiency. In contrast, in the electrolytic cell 1B of the second embodiment, since the hydrophobic porous body 23 can be formed of the insulator, it is possible to inhibit the lowering of the $CO_2$ reduction efficiency while enhancing the hydrophobic function of the hydrophobic porous body 23.

That is, in the electrolytic cell 1B of the second embodiment, it is possible to increase the content of the fluororesin in the hydrophobic porous body 23, and further set the content of the fluororesin in the hydrophobic porous body 23 to substantially 100 mass %. In the electrolytic cell 1B of the second embodiment, the content of the fluororesin in the hydrophobic porous body 23 is preferably 50 mass % or more, more preferably 70 mass % or more, and still more preferably substantially 100 mass %. Examples of a porous material having the fluororesin as the whole hydrophobic porous body 23 include a membrane filter and a sheet of hydrophobic PTFE. The use of such a hydrophobic porous body 23 enables the more effective prevention of the mixture of the cathode solution into the $CO_2$ gas flow path 24 to enhance the property of the electrolytic cell 1B and its sustainability.

Third Embodiment

Figure 7:
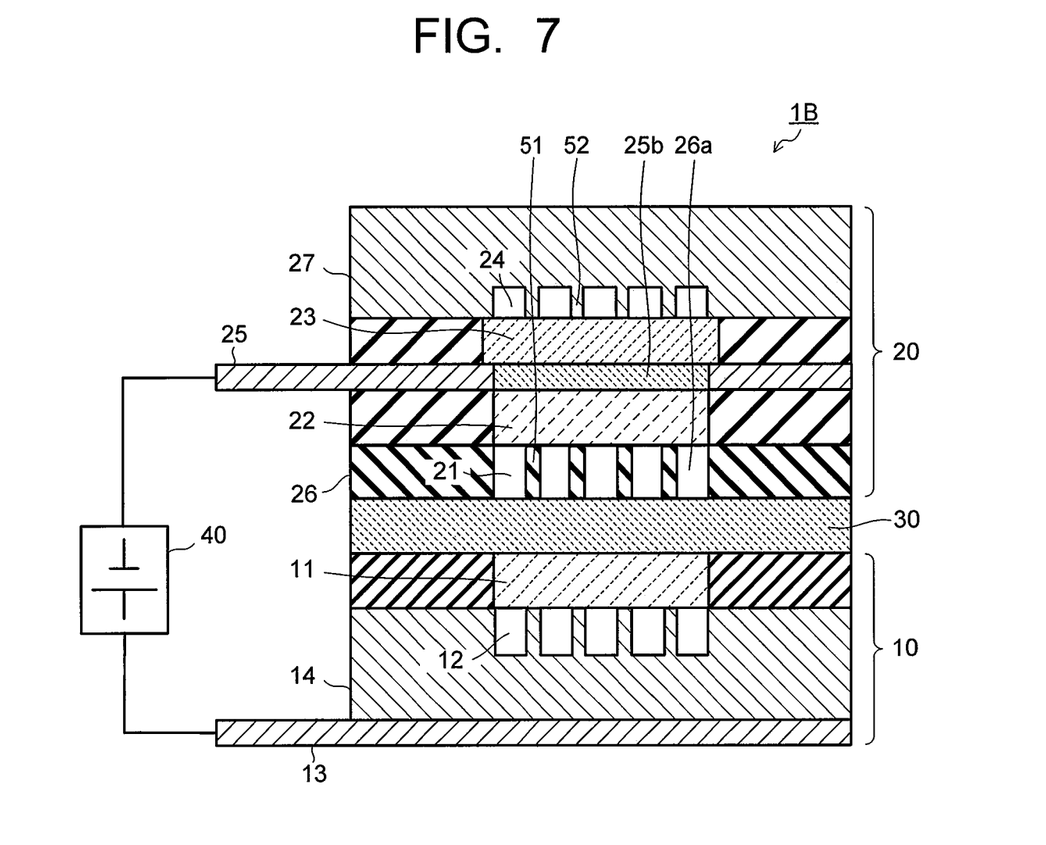
FIG. 7 is a sectional view illustrating an electrolytic cell of a third embodiment.

Next, an electrolytic cell for carbon dioxide according to a third embodiment will be described with reference to FIG. 7. The electrolytic cell 1C for carbon dioxide illustrated in FIG. 7 includes an anode part 10, a cathode part 20, and a separator 30 as in the second embodiment. The structures of the anode part 10, the cathode part 20, the separator 30, and so on and the structure of an electrolytic device using the electrolytic cell 1C are the same as those in the second embodiment. In the electrolytic cell 1C illustrated in FIG. 7, the cathode current collector plate 25 is disposed between the cathode 22 and the hydrophobic porous body 23, which is a different point from the electrolytic cell 1B of the second embodiment.

The cathode current collector plate 25 is in contact with the cathode 22 (for example, the gas diffusion layer 221), so that they are in electrical continuity. In order for the cathode current collector plate 25 disposed between the cathode 22 and the hydrophobic porous body 23 not to prevent the $CO_2$ gas flowing in the $CO_2$ gas flow path 24 from coming into contact with the cathode 22, an area 25b, in the cathode collector plate 25, in contact with the gas diffusion layer 221 is formed into a shape allowing the passage of the $CO_2$ gas by, for example, meshing, punching, or porosification processing. Alternatively, the area 25b in contact with the gas diffusion layer 221 may have openings whose open area ratio is 40% or more. As the cathode collector plate 25, a material low in chemical reactivity and high in conductivity is preferably used. Examples of such a material include metal materials such as Ti and SUS, and carbon.

Disposing the cathode current collector plate 25 between the cathode 22 and the hydrophobic porous body 23 enables the use of an insulator as the hydrophobic porous body 23 as in the second embodiment. This makes it possible to inhibit the lowering of $CO_2$ reduction efficiency while enhancing the hydrophobic function of the hydrophobic porous body 23. In the electrolytic cell 1C of the third embodiment, the content of the fluororesin in the hydrophobic porous body 23 can be increased, and the content of the fluororesin in the hydrophobic porous body 23 can be further set to substantially 100 mass %, as in the second embodiment. In the hydrophobic porous body 23, the content of the fluororesin and a specific material are preferably the same as those of the second embodiment. The use of such a hydrophobic porous body 23 enables the more effective prevention of the mixture of the cathode solution into the $CO_2$ gas flow path 24 to enhance the property of the electrolytic cell 1C and its sustainability.

EXAMPLES

Next, examples and their evaluation results will be described.

Example 1

The electrolytic cell 1B for carbon dioxide whose structure is illustrated in FIG. 6 was assembled and its carbon dioxide electrolytic performance was examined. Specifically, a solution system and a gas system illustrated in FIG. 8 were connected to the electrolytic cell 1B illustrated in FIG. 6 to form an electrolytic device, and the carbon dioxide electrolytic performance was examined. In the electrolytic device illustrated in FIG. 8, a first solution system having a pressure control part 61, an anode solution tank 62, a flow rate control part (pump) 63, and a reference electrode 64 connects with the anode solution flow path 12 so that the anode solution circulates in the anode solution flow path 12.

Figure 8:
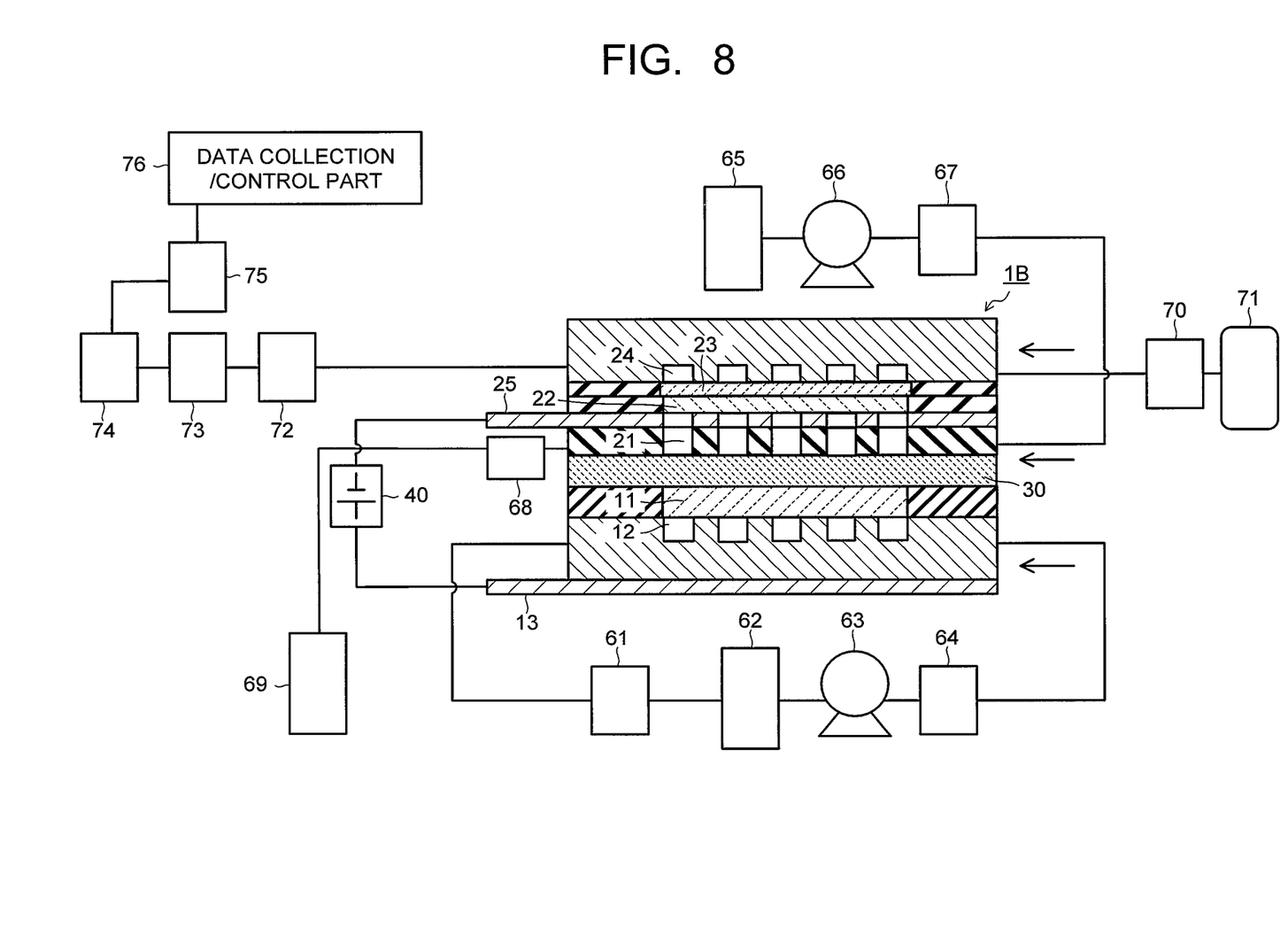
FIG. 8 is a view illustrating the structure of an electrolytic device for carbon dioxide of an example.

A second solution system having a cathode solution tank 65, a flow rate control part (pump) 66, a reference electrode 67, a pressure control part 68, and a waste liquid tank 69 connects with the cathode solution flow path 21 so that the cathode solution is supplied to the cathode solution flow path 21. The $CO_2$ gas is introduced into the $CO_2$ gas flow path 24 from a $CO_2$ gas cylinder 71 through a flow rate control part 70. The $CO_2$ gas which has flowed in the $CO_2$ gas flow path 24 is sent from the not-illustrated gas outlet port to a gas-liquid separating part 73 through the pressure control part 72, and is further sent to a product collecting part 74. The product collecting part 74 is provided with an electrolytic cell performance detecting part 75. The operations of these parts are controlled by a data collection/control part 76.

As the anode 11, an electrode having a Ti mesh coated with $IrO_2$ nanoparticles serving as a catalyst was used. As the anode, a 2×2 cm portion cut out from the $IrO_2$/Ti mesh was used.

As the catalyst layer of the cathode 22, a coating layer of carbon particles carrying gold nanoparticles was used. As the gas diffusion layer, carbon paper having MPL (microporous layer) was used. The cathode was fabricated by the following procedure. First, a coating solution in which the carbon particles carrying the gold nanoparticles were mixed with pure water, a Nafion solution, and IPA (isopropyl alcohol) was prepared. The amount of the gold nanoparticles carried was 15.1 mass %. This coating solution was filled in an airbrush and spray-coated the carbon paper having MPL, using an Ar gas. After the coating, the resultant was washed with running pure water for thirty minutes, and thereafter immersed in a hydrogen peroxide solution to be deprived of an organic substance such as IPA by oxidation. From the resultant, a 2×2 cm portion was cut out as the cathode (electrode area D=4 $cm^2$). Incidentally, an application amount of Au was estimated as about 0.4 mg/$cm^2$ from a mixture amount of the gold nanoparticles and the carbon particles in the coating solution.

To form the electrolytic cell 1B, the $CO_2$ gas flow path 24 (the third flow path plate 27), the hydrophobic porous body 23, the cathode 22, the cathode current collector plate 25, the cathode solution flow path 21 (the second flow path plate 26), the separator 30, the anode 11, the anode solution flow path 12 (the first flow path plate 14), and the anode current collector plate 13 were stacked in the mentioned order from the top as illustrated in FIG. 6, and the resultant was sandwiched by not-illustrated support plates and was further fastened with bolts. As the hydrophobic porous body 23, a PTFE porous sheet with a thickness of 80 μm and a porosity of 60 to 80% was used. As the separator 30, an anion exchange membrane was used. The $IrO_2$/Ti mesh as the anode 11 was brought into close contact with the anion exchange membrane. The cathode solution flow path 21 had a thickness of 1 mm. In the stacking, the longitudinal direction of the lands of the cathode solution flow path 21 and the longitudinal direction of the lands of the $CO_2$ gas flow path 24 and the anode solution flow path 12 were set parallel to each other. Note that an evaluation temperature was set to a room temperature.

The electrolytic device illustrated in FIG. 8 was run under the following condition. A $CO_2$ gas was supplied to the $CO_2$ gas flow path at 20 sccm, while an aqueous potassium hydroxide solution (concentration 1M KOH) was made to flow in the cathode solution flow path at a 20 mL/minute flow rate and a potassium hydroxide solution (concentration 1M KOH) was made to flow in the anode solution flow path at a 20 mL/minute flow rate. Next, using an electrochemical measurement system (manufactured by Bio-Logic) as the power source, a constant current was passed across the anode and the cathode to cause an electrolytic reaction of $CO_2$, and a cell voltage, a cathode potential, and an anode potential at this time were collected. Further, a gas output from the $CO_2$ gas flow path was partly collected, and a production amount of CO or a $H_2$ gas produced through the $CO_2$ reduction reaction or the water reduction reaction was analyzed with a gas chromatograph. From the gas concentrations, CO production selectivity $S_{CO}$ [%] and $H_2$ production selectivity $S_{H2}$ [%] were calculated using the following formulas.

$$S_{CO} = \frac{C_{CO}}{C_{CO} + C_{H2}}$$

$$S_{H2} = \frac{C_{H2}}{C_{CO} + C_{H2}}$$

$C_{CO}$ is the CO concentration [ppm], and $C_{H2}$ is the $H_2$ concentration [ppm].

Figure 9:
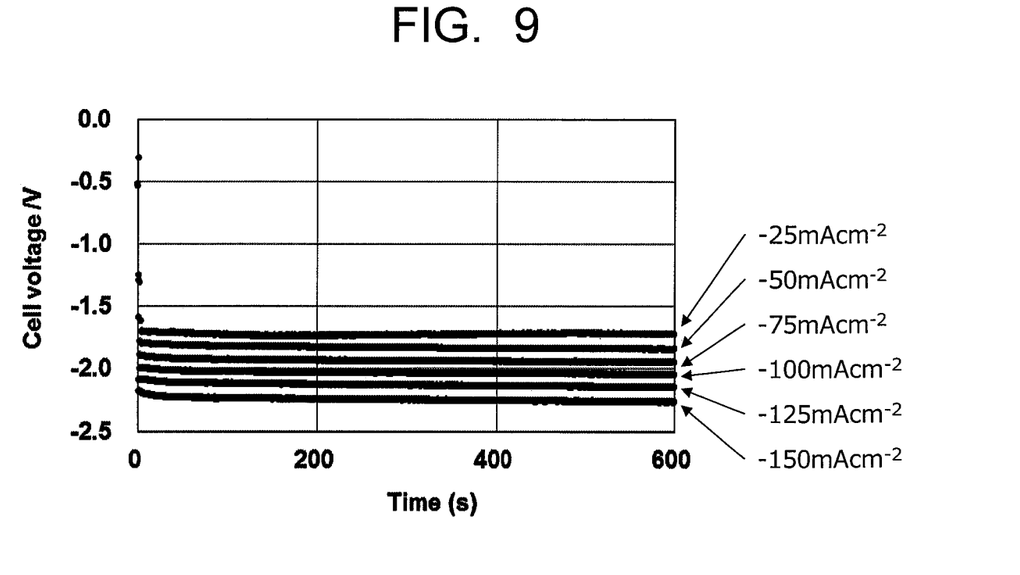
FIG. 9 is a chart illustrating temporal changes in cell voltage in the electrolytic device for carbon dioxide of the example.
Figure 10:
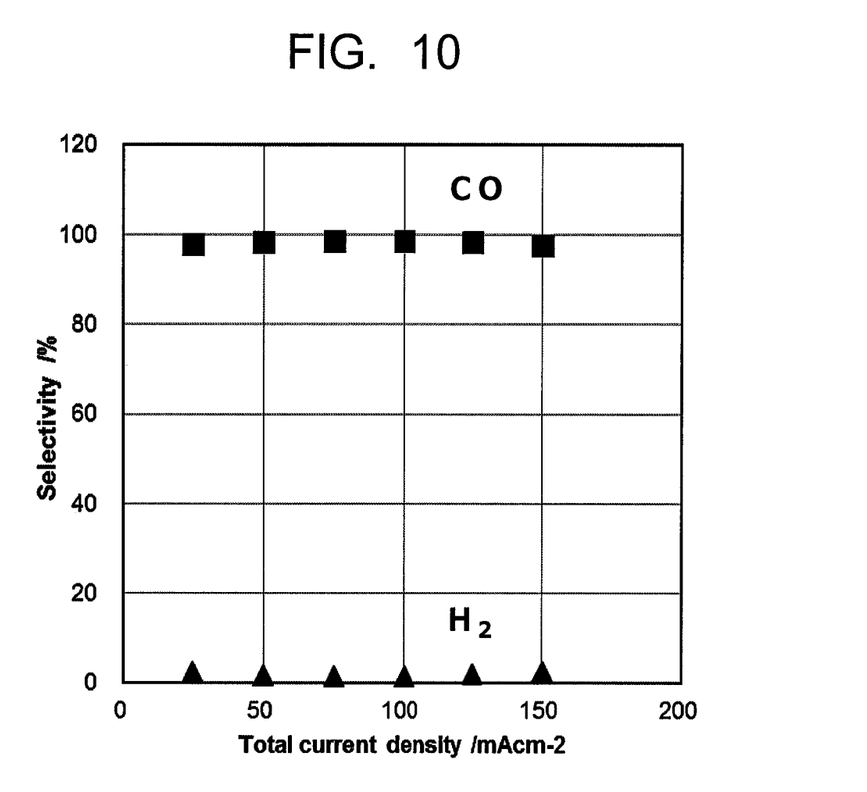
FIG. 10 is a chart illustrating the production selectivity of a gaseous production component in the electrolytic device for carbon dioxide of the example.

FIG. 9 illustrates temporal changes in the cell voltage under the varied current density when 1M KOH was used as the cathode solution. The electrode area was 4 $cm^2$. Here, the cell voltage is a cathode-anode potential difference. The cathode potential is a potential relative to a saturated KCl solution Ag/AgCl reference electrode. As illustrated in FIG. 9, during 600 seconds, the temporal fluctuations in the cell voltage are small, which shows that the operation is stable under a wide current density range. FIG. 10 illustrates the production selectivities vs. the total current density (absolute value). The production selectivities were calculated from the CO and $H_2$ concentrations in the gas collected in a Tedlar bag (sampling bag) during 300 s to 520 s. The CO production selectivity is 97% or more, which shows that a good property with the high CO production selectivity was obtained.

It should be noted that the structures of the above-described embodiments may be employed in combination, or part thereof may be modified. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrolytic cell for carbon dioxide comprising:
   an anode part including an anode to oxidize water or a hydroxide ion and thus produce oxygen and an anode solution flow path to supply an anode solution to the anode;
   a cathode part including a cathode to reduce carbon dioxide and thus produce a carbon compound, a cathode solution flow path to supply a cathode solution to the cathode, a gas flow path to supply the carbon dioxide to the cathode, and a hydrophobic porous body disposed between the cathode and the gas flow path; and
   a separator to separate the anode part and the cathode part from each other,
   wherein the cathode includes a catalyst layer facing the cathode solution flow path and a gas diffusion layer in contact with the hydrophobic porous body, and the hydrophobic porous body is disposed between the gas diffusion layer and the gas flow path.

2. The cell according to claim 1, wherein the hydrophobic porous body contains a fluororesin in an amount of 50 mass % or more as a hydrophobic substance.

3. The cell according to claim 1,
   wherein the hydrophobic porous body contains a fluororesin in an amount of 50 mass % or more as a hydrophobic substance, and
   wherein the gas diffusion layer contains a fluororesin in an amount of not less than 5 mass % nor more than 10 mass % as a hydrophobic substance.

4. The cell according to claim 1, wherein the hydrophobic porous body has a porosity of not less than 40% nor more than 90%.

5. The cell according to claim 1, wherein the anode part includes an anode current collector plate in electrical connection with the anode, and the cathode part includes a cathode current collector plate in electrical connection with the cathode.

6. The cell according to claim 5, wherein the cathode current collector plate is disposed between the cathode solution flow path and the cathode.

7. The cell according to claim 6, wherein the cathode current collector plate has an opening with a 40% open area ratio or more.

8. The cell according to claim 5, wherein the cathode current collector plate is disposed between the cathode and the hydrophobic porous body.

9. The cell according to claim 8, wherein the cathode current collector plate has an opening with a 40% open area ratio or more.

10. The cell according to claim 1, wherein the hydrophobic porous body is larger in area than the cathode.

11. An electrolytic device for carbon dioxide comprising:
    the electrolytic cell according to claim 1; and
    a power source to pass a current across the anode and the cathode of the electrolytic cell.

12. An electrolytic cell for carbon dioxide comprising:
    an anode part including an anode to oxidize water or a hydroxide ion and thus produce oxygen and an anode solution flow path to supply an anode solution to the anode;
    a cathode part including a cathode to reduce carbon dioxide and thus produce a carbon compound, a cathode solution flow path to supply a cathode solution to the cathode, a gas flow path to supply the carbon dioxide to the cathode, and a hydrophobic porous body disposed between the cathode and the gas flow path; and
    a separator to separate the anode part and the cathode part from each other,
    wherein the hydrophobic porous body contains a fluororesin in an amount of 50 mass % or more as a hydrophobic substance.

13. The cell according to claim 12, wherein the hydrophobic porous body has a porosity of not less than 40% nor more than 90%.

14. The cell according to claim 12, wherein the anode part includes an anode current collector plate in electrical connection with the anode, and the cathode part includes a cathode current collector plate in electrical connection with the cathode.

15. The cell according to claim 14, wherein the cathode current collector plate is disposed between the cathode solution flow path and the cathode.

16. The cell according to claim 14, wherein the cathode current collector plate is disposed between the cathode and the hydrophobic porous body.

17. An electrolytic device for carbon dioxide comprising:
    the electrolytic cell according to claim 12; and
    a power source to pass a current across the anode and the cathode of the electrolytic cell.

18. An electrolytic cell for carbon dioxide comprising:
an anode part including an anode to oxidize water or a hydroxide ion and thus produce oxygen and an anode solution flow path to supply an anode solution to the anode;
a cathode part including a cathode to reduce carbon dioxide and thus produce a carbon compound, a cathode solution flow path to supply a cathode solution to the cathode, a gas flow path to supply the carbon dioxide to the cathode, and a hydrophobic porous body disposed between the cathode and the gas flow path; and
a separator to separate the anode part and the cathode part from each other, wherein the anode part includes an anode current collector plate in electrical connection with the anode, and the cathode part includes a cathode current collector plate in electrical connection with the cathode, and
wherein the cathode current collector plate is disposed between the cathode and the hydrophobic porous body.

19. The cell according to claim 18, wherein the cathode current collector plate has an opening with a 40% open area ratio or more.

20. An electrolytic device for carbon dioxide comprising:
the electrolytic cell according to claim 18; and
a power source to pass a current across the anode and the cathode of the electrolytic cell.

\* \* \* \* \*